US012702989B2

(12) United States Patent
Murphy et al.

(10) Patent No.: US 12,702,989 B2
(45) Date of Patent: Aug. 11, 2026

(54) ANNULAR EFFERVESCENT NOZZLE

(71) Applicant: PALO ALTO RESEARCH CENTER INCORPORATED, Palo Alto, CA (US)

(72) Inventors: Kathryn F. Murphy, Redwood City, CA (US); David K. Biegelsen, Portola Valley, CA (US); Armand P. Neukermans, Portola Valley, CA (US); Gary F. Cooper, Los Altos, CA (US); Lee Kanne Galbraith, San Jose, CA (US); Sudhanshu Jain, Santa Clara, CA (US); Geordie Zapalac, Santa Clara, CA (US)

(73) Assignee: GENESEE VALLEY INNOVATIONS, LLC, Santa Clara, CA (US)

(*) Notice: Subject to any disclaimer, the term of this patent is extended or adjusted under 35 U.S.C. 154(b) by 470 days.

(21) Appl. No.: 17/834,745

(22) Filed: Jun. 7, 2022

(65) Prior Publication Data

US 2023/0027176 A1 Jan. 26, 2023

Related U.S. Application Data

(60) Provisional application No. 63/225,621, filed on Jul. 26, 2021.

(51) Int. Cl.
*B05B 7/04* (2006.01)

(52) U.S. Cl.
CPC .................................. *B05B 7/0433* (2013.01)

(58) Field of Classification Search
CPC .... B05B 7/0408–0491; B05B 7/00–32; B05B 5/00–1691; B05B 1/341; B05B 1/3415; B05B 1/3421; B05B 1/3426; B05B 1/3442; B05B 1/265; B05B 7/10; B05B 7/0466; B05B 7/04; B05B 7/0433; B05B 7/0441; B05B 1/06; B05B 7/067; B05B 1/3405; B05B 7/068
USPC .......................................................... 239/433
See application file for complete search history.

(56) References Cited

U.S. PATENT DOCUMENTS 2,447,123 A * 8/1948 Harry .................. A61H 33/027 4/615
3,680,781 A * 8/1972 Lincoln .................. F28F 25/06 239/431
3,923,247 A * 12/1975 White ....................... F25C 3/04 239/14.2
4,361,285 A * 11/1982 Koppehele ............. B01F 25/72 239/524
5,639,024 A * 6/1997 Mueller .................. B05B 7/065 239/432
5,685,482 A * 11/1997 Sickles .................. B05B 7/065 239/707
5,697,553 A * 12/1997 Stotts ...................... B05B 7/068 239/406
2005/0274825 A1 12/2005 Seguin
(Continued)

*Primary Examiner* — Arthur O. Hall
*Assistant Examiner* — Juan C Barrera
(74) *Attorney, Agent, or Firm* — Miller Nash LLP

(57) ABSTRACT

A nozzle includes a housing having an inner chamber, a first opening connected to the inner chamber, and a second opening connected to the inner chamber, and a solid, partially conical, plug in the second opening, the solid plug configured to leave a slit around the plug connected to the inner chamber, and the plug extending beyond an end of the housing.

16 Claims, 8 Drawing Sheets

(56) References Cited

U.S. PATENT DOCUMENTS

2007/0164130 A1* 7/2007 Jackson .................. B05B 5/032
239/433
2016/0088808 A1* 3/2016 Sheets .................. B05B 1/3006
239/63

* cited by examiner

ANNULAR EFFERVESCENT NOZZLE

CROSS REFERENCE TO RELATED APPLICATION

This application claims priority to and the benefit of U.S. Provisional Application No. 63/225,621 filed Jul. 26, 2021, which is incorporated herein by reference in its entirety.

TECHNICAL FIELD

This disclosure relates to creation of aerosol droplets, more particularly to using a nozzle having an annular exit orifice.

BACKGROUND

Creating aerosol droplets with sub-micron diameters presents a considerable engineering challenge. Conventional spray nozzles, forcing water through a narrow orifice produces mists with diameters in the tens of microns to several millimeters. To decrease droplet size by a factor of ten, the pressure for a given nozzle must increase by more than 2,000 times. Achieving the pressures needed to produce submicron droplets requires large amounts of energy and can quickly lead to nozzle failure. Other atomizers, like the ultrasonic nebulizers found in home humidifiers, can produce droplets with diameters in the single-digit microns, but cannot go smaller without extremely high frequencies and power requirements.

Electrospray atomization can produce submicron droplets, using a large electrical field to draw a fine jet of liquid from a capillary. However, electrospray atomization has low throughput, does not work with all liquids, and in many cases cannot operate in air due to dielectric breakdown under the high electrical field.

Another atomization method called supercritical spraying can produce submicron droplets by heating the liquid at high pressure above its critical point. Dramatically reducing the viscosity and the surface tension allows easier formation of smaller drops. However, the high temperatures and pressures require large amounts of energy, and the nozzle requires expensive materials and manufacturing methods to avoid corrosion.

Effervescent atomization also produces submicron droplets at room temperature by flowing water and air through a nozzle such that the air occupies the center and the water forms an annular sheath. If the air velocity exceeds the speed of sound inside the nozzle (i.e., under choked flow conditions), it will rapidly expand as it exits. This expansion effectively "explodes" the annular sheath into very small droplets. Although effective, this method requires large volumes of compressed air, adding to energy requirements and cost. This limits the size of the nozzle and hence the throughput from a single nozzle, since the gas-to-liquid ratio (GLR) would increase as the nozzle diameter squared.

SUMMARY

According to aspects illustrated here, there is provided a nozzle having a housing having an inner chamber, a first opening connected to the inner chamber, and a second opening connected to the inner chamber, and a solid, partially conical, plug in the second opening, the solid plug configured to leave a slit around the plug connected to the inner chamber, and the plug extending beyond an end of the housing.

BRIEF DESCRIPTION OF THE DRAWINGS

FIG. 6 shows an embodiment of an annular nozzle having a charging element.

DETAILED DESCRIPTION OF THE EMBODIMENTS

The embodiments here decouple the nozzle size from the gas-to-liquid ratio (GLR), enabling the replacement of dozens with a single nozzle without a concomitant increase of air. Nozzles of the embodiments flow air through the center of a circular channel and liquid in a sheath along the walls. The embodiments fill most of the space normally filled with air with a solid piece, requiring less air. The presence of the solid center also enables charging and impaction of droplets. The embodiments enable high throughput production of submicron droplets at relatively low pressures, in the range of less than 100 bar, and with limited air flow using a circular, or annular, slit, rather than a circular orifice. While annular nozzles are known, such as that discussed in US Patent Publication No. 2005/0274825, no annular nozzles use a solid piece that is at least partially conical, nor does the solid piece extend beyond the end of the nozzle housing.

Figure 1:
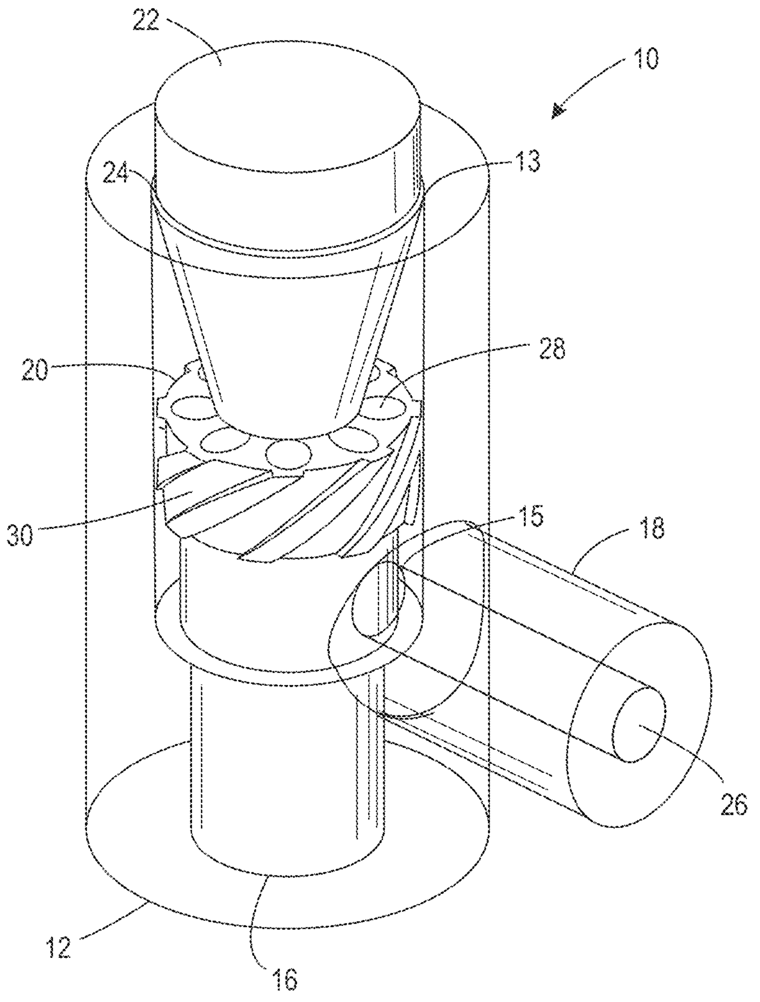
FIG. 1 shows an embodiment of an annular nozzle.

The embodiments fill most of the chamber volume, normally filled with air, with a solid piece allowing use of larger nozzles to produce more droplets without an increase in GLR. FIG. 1 shows an embodiment of such a nozzle. The nozzle 10 has a pipe 12 with an inside diameter 14, which may be referred to as a housing. The pipe 12 has an opening 15 to provide a water inlet 26 in a pipe 18. The inlet 26 allows water to enter the inside region or chamber 14 of the pipe 12. Air enters the nozzle through an inner pipe 16 and enters the inside chamber 14 through at least one air channel such as 28 in the portion 20 of the inner pipe 16. The portion 20 has water channels 30 that direct the water towards the top opening 13 of the nozzle as it enters the inside chamber 14. The water channels may also provide a swirling effect to the water that causes the water to cling to the outer walls of the chamber 14.

The plug 22 fills much of the empty volume. By filling the empty space with a solid element, it allows the nozzle to function at much lower pressure and air flow rate than would otherwise be obtainable. In the embodiments here, the solid element comprises a partially conical plug. The term "partially conical" as used here means an element that has at least a conical section. As shown in FIG. 1, the plug has a middle conical section that has been truncated at the bottom and the top takes on a cylindrical shape that extends past the end of the pipe 12. By filling the volume partially with a solid component, it reduces the pressure needs to well below 100 bar. Some embodiments function at 10-20 bar. The conical section of the plug 22 acts to intercept and spread the emerging flow. Cone angles of 15 degrees or more may have more effectiveness. To further enhance the spreading of the water, which may be referred to as a plume, the plug may have a center orifice to supply air to further expand the plume.

Figure 2:
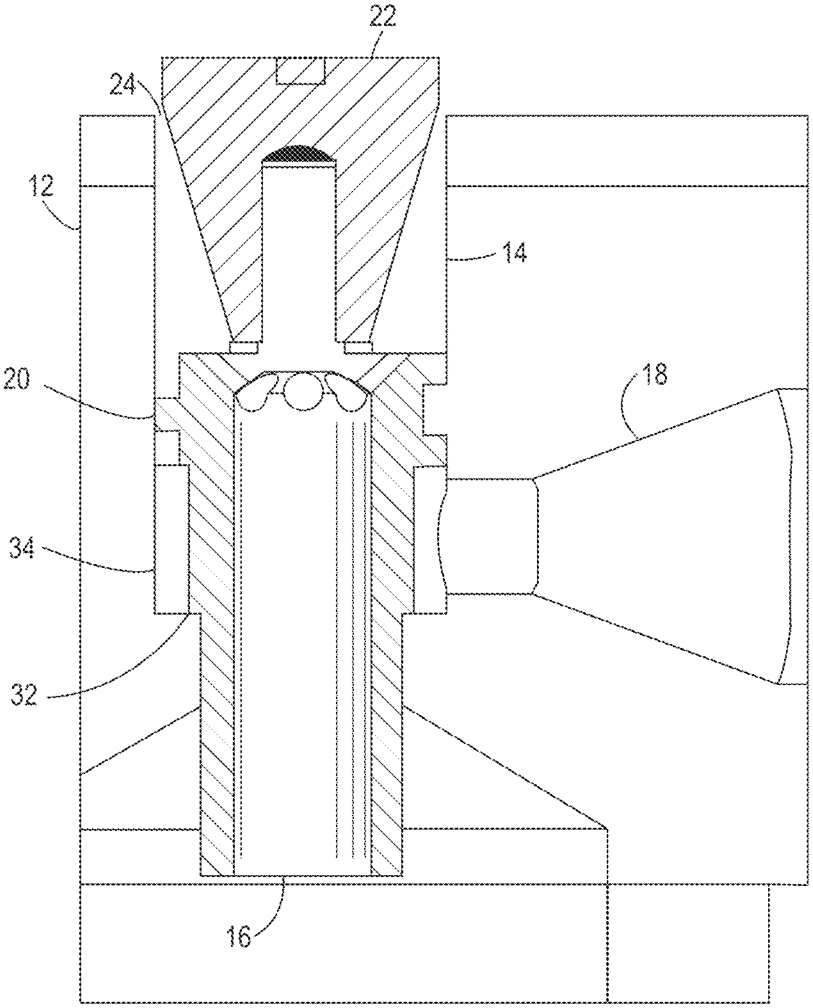
FIG. 2 shows a side view of an embodiment of an annular nozzle.

FIG. 2 shows a side view of an embodiment of an annular nozzle. The pipe 16 inserts into pipe 12. The pipe 12 has two different portions. A lower portion, as seen in the figure, has a narrower diameter, and then has a 'step' 32 where the inner diameter widens out to the form the chamber 14. The inner pipe 16 has a similar narrower portion at the bottom, as oriented in the figure, it then widens out as well, allowing the inner pipe to rest on the step 34 inside the outer pipe 12. The inner pipe 16 may have three portions. The narrower portion at the bottom, the middle portion that is wider than the bottom portion, and then the channel portion 20 that has the water channels and the air channels. As can be seen in the figure, the water pipe 18, with the inner water channel connects to the channel to the side in this embodiment.

Figure 3:
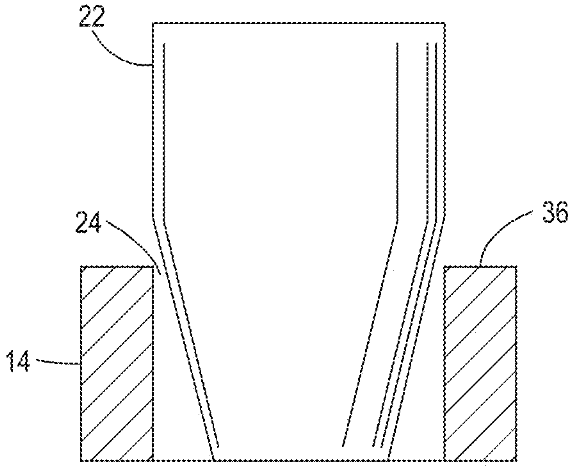
FIG. 3 shows a diagram of water inside the annular nozzle.

In operation, the water enters the chamber 14 through the pipe 26. Air enters the inside through the air channels such as 28 shown in FIG. 1. The air pressure and the configuration of the solid element 22 inside the nozzle causes the air to swirl and drives the water 36 into a annular sheath along the outside walls of the chamber 14 as shown in FIG. 3. The air velocity inside the nozzle exceeds the speed of sound (supersonic), and as it exits the nozzle through the slit 24 with the water, the air expands rapidly and causes the water to explode into very small droplets.

Figure 4:
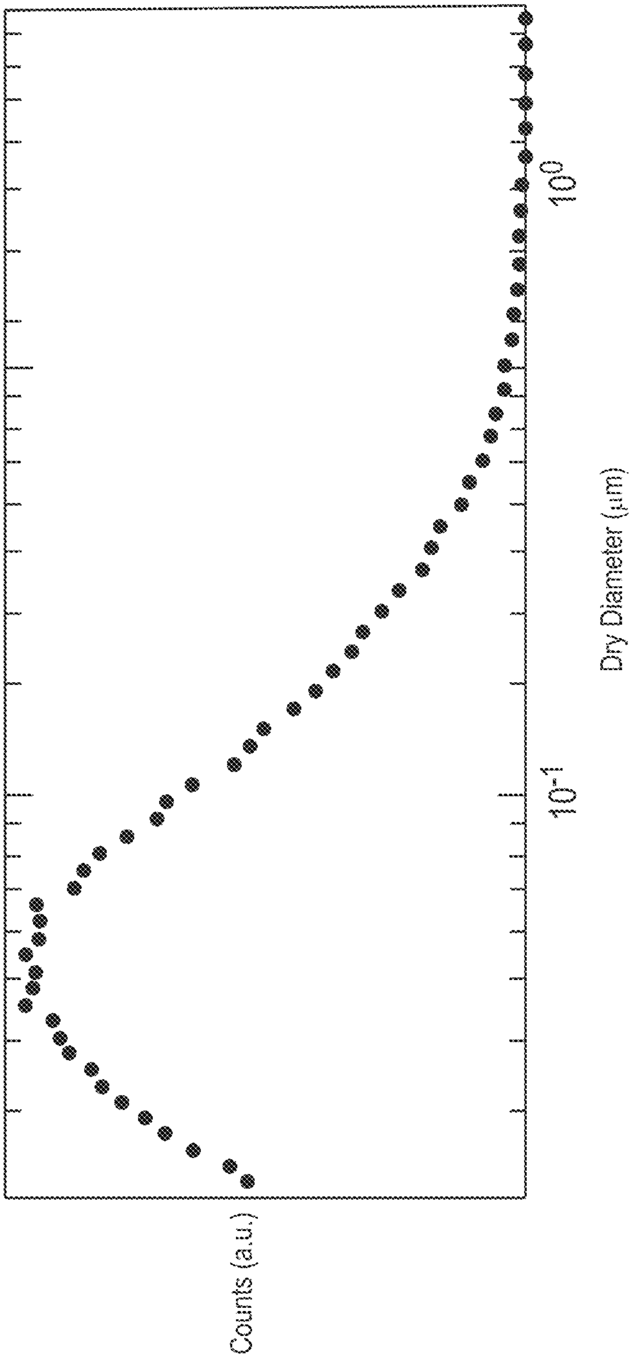
FIG. 4 shows a diagram of representative particle size distribution

The use of the solid component allows this type of nozzle to generate very small droplets using less energy and lower pressures, and also without an increase in GLR. FIG. 4 shows a graph of the particle size distribution created by the nozzle for dry salt particles. For sea water, one would typically multiply by approximately 3.9 for water droplet sizes.

Figure 5:
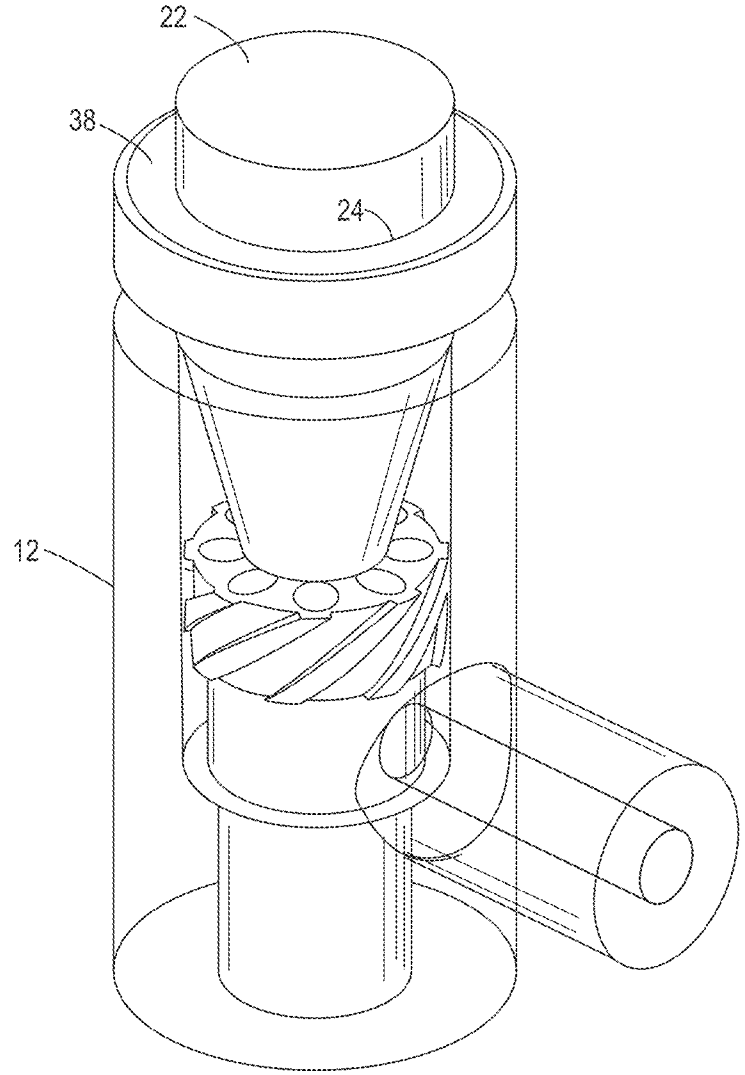
FIG. 5 shows an embodiment of an annular nozzle having an impactor.
Figure 5:
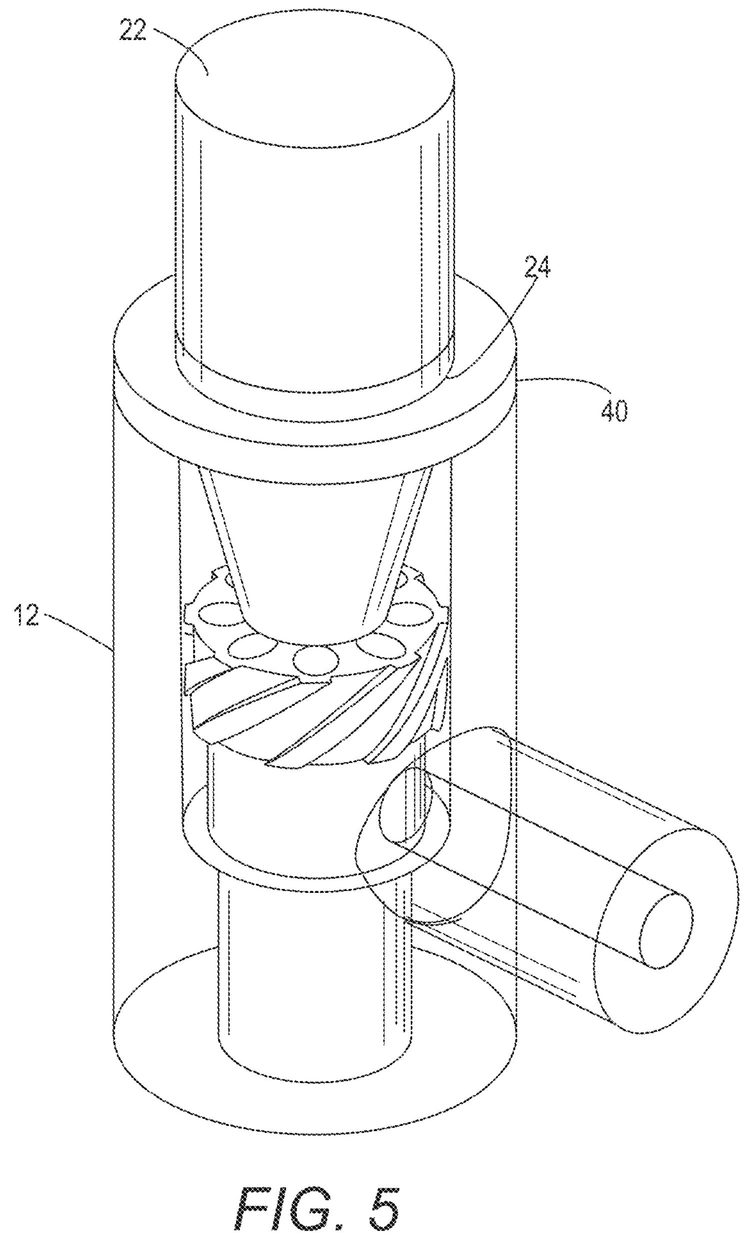

The use of a solid component allows for other modifications. FIG. 5 shows an embodiment of the nozzle having an impactor 38. The impactor removes or breaks up the larger droplets, resulting in a finer mist with more of the mass of sprayed liquid into submicron droplets. The broken up droplets will exit the annular slit 24 before striking the impactor. The use of an impactor may increase the effectiveness of the nozzle. The impactor may also reside a distance from the nozzle to further break up droplets.

The solid component would allow use of a charging element, shown in FIG. 6 as ring 40. The ring may be coated with a high dielectric material, such as a lead zirconate titanate (PZT), titanium oxide, etc. The ring may be held at a high potential while the center plug is grounded, or the reverse. The nozzle effectively becomes an annular capacitor. At high enough fields and water velocity, charge separation could occur, resulting in charged droplets. Charged droplets have many uses, such as in additive manufacturing in which the charged droplets accumulate on differently charged regions on a surface. Alternatively, the apparatus may have the ring separated from the nozzle body and used to apply charge to a conductive liquid.

Further considerations in using a charging ring include controlling the diameter of the water supply. Using a thin diameter of the water pipe allows use of the full cylinder of water, this may result in higher charging per unit volume of liquid or per drop than if the system uses larger diameters. Charge may be induced on the water sheet when it enters the charging ring, but might disappear when it exits the inducing field, as it about to break up. To conserve its charge, the shell of water should disintegrate before the charge is lost by flowing back to the source. This can be done by choosing the design parameters of the sprayer and the charger at the exit point, the time constant of the discharge must be larger than the breakup time, in some embodiments by a factor of 2 to 3.

Another consideration is managing various parameters to generate effective charging. At the exit, the time constant is given by the product Rx C. Here R is the resistance of the water shell, $R=l*\rho/t_w*\pi*d$, where l is the length of the charging ring, ρ is the resistivity of the liquid used, $\pi*d$ is the circumference of the charging ring and $t_w$ the thickness of the water shell. C is the capacitance with respect to the electrode, $C=l*\pi*d*\varepsilon/t_c$ where l is the length of the charging ring, ε the dielectric constant of capacitor dielectric, and $t_c$ the thickness of the dielectric on the charging electrode. From experimental observations, an estimate of the breakup time TB roughly equals $TB=t_w/v$ where v is the velocity of the liquid shell. Hence the required condition for effective charging is $Rx\ C=l^2\ \rho\varepsilon/t_w\ t_c>TB=t_w/v$. The electrode/charging ring may use a very thin high dielectrics coating such as titanium dioxide, barium titanate, PZT, having a thickness on the order of 1 micron.

Another method to improve effectiveness, the cone may comprise a super hydrophobic material, or have a coating of a super hydrophobic material. The cone may reside in the plume so as to optimally intercept the large droplets and to let small droplets pass by in the fashion of a standard impactor. Upon collision with this type of target, large droplets are broken up, which substantially enhances the sprayed distribution.

Figure 7:
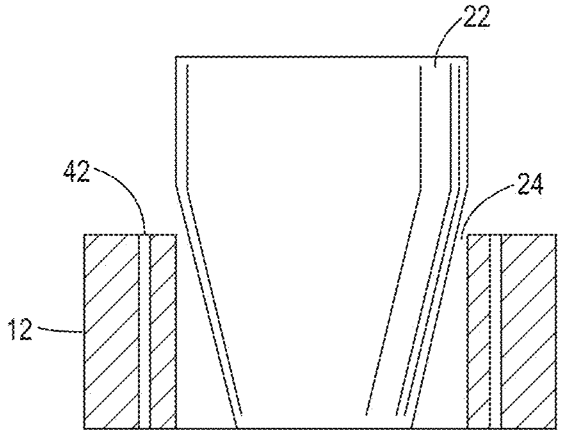
FIG. 7 shows a view of an embodiment of an annular nozzle having a sheathing flow.
Figure 8:
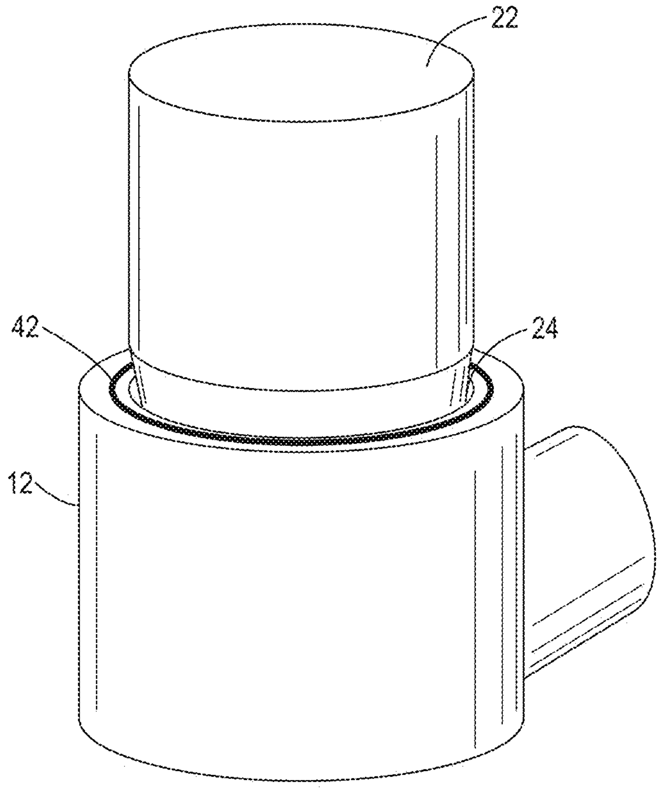
FIG. 8 shows an alternative view of an embodiment of an annular nozzle having a sheathing flow.

Other modifications and variations may exist. For example, the spray may undergo inductive or conductive charging to prevent coalescence. The nozzle may have a separate annular channel surrounding the primary channel to form an additional air sheath. FIGS. 7 and 8 show this as 42. It surrounds the nozzle outlet 24 with the plug 22 in the center. This would act to further break up the droplets.

Figure 9:
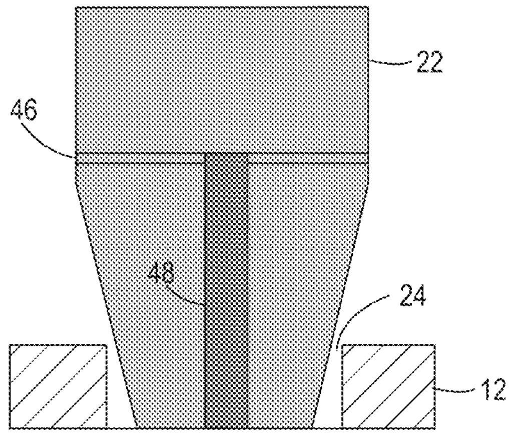
FIG. 9 shows a view of an annular nozzle with an auxiliary air flow.

As shown in FIG. 9, additional air channels 46 and 48, placed so that the exiting airflow enters channel 48 and then channel 46. Channel 46 directs across the flow of droplets at the ends of the channel where the droplets exit the annular nozzle slit 24, would further break up the droplets. The water may flow into the nozzle at an angle to increase the swirl. Other modifications may apply to various components of the system. For example, the annular slit may not take a circular shape, but instead may have the shape of a rectangle.

One use of such a nozzle may exist for marine cloud brightening. The process of marine cloud brightening, also referred to as marine cloud seeding or marine cloud engineering, proposes to make clouds brighter to reflect a small fraction of incoming sunlight back into space. The goal is to offset anthropogenic global warning. By spraying submicron droplets of water or salt water in atmospheric locations where clouds form, the droplets can act as nuclei, increasing the cloud cover that reflect the light.

For marine cloud brightening and many other applications, the nozzles could be multiplexed, or deployed in arrays to allow for large area coverage. The nozzle or nozzles may be of many different sizes.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A nozzle, comprising:

a first pipe having a first portion having a first diameter, and a second portion having a second diameter wider than the first diameter having a step between the first portion and the second portion;

an inner pipe, the inner pipe having a lower portion having a lower diameter and a channel portion having a channel diameter wider than the lower diameter, the channel portion resting on the step;

an inner chamber;

a primary air channel formed by the inner pipe separate from the inner chamber;

an inlet opening on a side of the first pipe, the inlet opening connected to the inner chamber;

a top opening connected to the inner chamber;

one or more angled channels in the inner chamber configured to cause water to swirl within the inner chamber; and at least one air opening structured to cause air to flow from the portion of the primary air channel separate from the inner chamber into the inner chamber; and a solid, partially conical, plug in the top opening, the solid plug configured to leave a slit around the plug connected to the inner chamber for an exiting airflow, and the plug extending beyond an end of the first pipe.

2. The nozzle as claimed in claim 1, wherein the nozzle further comprising an impactor arranged adjacent the solid plug.

3. The nozzle as claimed in claim 2, wherein the impactor surrounds the solid plug adjacent the slit.

4. The nozzle as claimed in claim 2, wherein the impactor resides a distance offset from the slit.

5. The nozzle as claimed in claim 1, further comprising an electrical charging element adjacent the plug.

6. The nozzle as claimed in claim 5, wherein the charging element further comprises a ring surrounding the solid plug adjacent the slit.

7. The nozzle as claimed in claim 5, wherein the charging element adjacent the plug comprises the charging element being separated from the nozzle.

8. The nozzle as claimed in claim 5, wherein the charging element has a dielectric coating.

9. The nozzle as claimed in claim 8, wherein the dielectric coating comprises one of titanium dioxide, barium titanate, or lead zirconate titanate (PZT).

10. The nozzle as claimed in claim 1, wherein the plug has a hydrophobic coating.

11. The nozzle as claimed in claim 1, wherein the plug comprises a hydrophobic material.

12. The nozzle as claimed in claim 1, wherein the at least one air opening comprises a plurality of air openings.

13. The nozzle as claimed in claim 12, wherein the plurality of air openings are angled.

14. The nozzle as claimed in claim 1, wherein the inlet opening is structured to cause water to flow into the inner chamber at an angle.

15. The nozzle as claimed in claim 1, further comprising an annular air channel surrounding the primary air channel, the annular air channel separate from the primary air channel.

16. The nozzle as claimed in claim 1, further comprising additional air channels placed so that the exiting airflow directs across a flow of droplets as the droplets exit the slit.

* * * * *